United States Patent [19]

Chamzas et al.

[11] Patent Number: 4,979,049
[45] Date of Patent: Dec. 18, 1990

[54] EFFICIENT ENCODING/DECODING IN THE DECOMPOSITION AND RECOMPOSITION OF A HIGH RESOLUTION IMAGE UTILIZING ITS LOW RESOLUTION REPLICA

[75] Inventors: Christodoulos Chamzas, West Long Branch; Donald L. Duttweiler, Rumson, both of N.J.

[73] Assignee: AT&T Bell Laboratories, Murray Hill, N.J.

[21] Appl. No.: 359,909

[22] Filed: Jun. 1, 1989

[51] Int. Cl.$^5$ ............................................. H04N 1/41
[52] U.S. Cl. ................................... 358/426; 358/462; 358/467; 358/133
[58] Field of Search ............... 358/426, 462, 467, 447, 358/133

[56] References Cited

U.S. PATENT DOCUMENTS

| 4,356,555 | 10/1982 | Ejiri et al. | 364/515 |
| 4,360,883 | 11/1982 | Ejiri et al. | 364/515 |
| 4,365,273 | 12/1982 | Yamada et al. | 358/260 |
| 4,366,506 | 12/1982 | Ejiri et al. | 358/260 |
| 4,870,497 | 9/1989 | Chamzas | 358/447 |
| 4,873,577 | 10/1989 | Chamzas | 358/447 |

OTHER PUBLICATIONS

C. Chamzas et al., "PED: Progressive Edge Decomposition of Facsimile Images", ISO/SC2/WG8 & CCITT SG VIII, Doc. No. JBIG-N32, Sep. 15, 1988.
R. B. Arps et al., "Progressive Adaptive Bi-Level Image Compression (PBIC) Proposal", ISO-/IEC/JTC1/SC2/WG8 JB1G No. 33, Rev. 4, Jan. 25, 1989.
BIS, Japan, "Progressive Coding Method for Bi-Level Images", ISO/JTC1/SC2/WG8 & CCITT SG VIII JB1G N-75, Jan. 1989.
"Facsimile Coding Schemes and Coding Control Functions for Group 4 Facsimile Apparatus", International Telephone and Telegraph Consultative Committee (CCITT), Redbook, Fascicle VII.3, Rec.T.6, 1984, pp. 40-48.

*Primary Examiner*—Edward L. Coles, Jr.
*Attorney, Agent, or Firm*—Thomas Stafford

[57] ABSTRACT

More efficient encoding/decoding in decomposing and recomposing a high resolution image is obtained by employing a unique prediction arrangement. The prediction arrangement determines whether high resolution pixels to be recomposed from low resolution pixels from a low resolution replica of the high resolution are so-called typically predictable or non-typically predictable by using general prediction rules. The general prediction rules are also employed to determine if any of the typically predictable high resolution pixels would be improperly recomposed. Such high resolution pixels which would be improperly recompased are identified as exceptions. It is noted that so-called supplemental information is required to properly recompose non-typically predictable pixels and typically predictable pixels which are identified as exceptions. To this end, exceptions accompany the low resolution pixel for which the corresponding high resolution pixels would otherwise be improperly recomposed.

26 Claims, 18 Drawing Sheets

FIG.5 SUBROUTINE READ-L

| GROUP ASSIGNMENT | SUPER PIXEL ASSIGNMENT |
|---|---|
| $U=L1(k-1,\ell-1)$ | $s1=h0(m,n)$ |
| $A=L1(k-1,\ell)$ | $s2=h0(m,n+1)$ |
| $D=L1(k-1,\ell+1)$ | $s3=h0(m+1,n)$ |
| $P=L1(k,\ell-1)$ | $s4=h0(m+1,n+1)$ |
| $S=L1(k,\ell)$ | |
| $N=L1(k,\ell+1)$ | |
| $K=L1(k+1,\ell-1)$ | |
| $B=L1(k+1,\ell)$ | |
| $L=L1(k+1,\ell+1)$ | |

| GROUP ASSIGNMENT |
|---|
| $P = L1(k, \ell-1)$ |
| $S = L1(k, \ell)$ |
| $N = L1(k, \ell+1)$ |
| $K = L1(k+1, \ell-1)$ |
| $B = L1(k+1, \ell)$ |
| $L = L1(k+1, \ell+1)$ |
| $u4 = h0(m-1, n-1)$ |
| $a3 = h0(m-1, n)$ |
| $a4 = h0(m-1, n+1)$ |
| $d3 = h0(m-1, n+2)$ |
| $p2 = h0(m, n-1)$ |
| $s1 = h0(m, n)$ |
| $s2 = h0(m, n+1)$ |
| $n1 = h0(m, n+2)$ |
| $p4 = h0(m+1, n-1)$ |
| $s3 = h0(m+1, n)$ |
| $s4 = h0(m+1, n+1)$ |

EFFICIENT ENCODING/DECODING IN THE DECOMPOSITION AND RECOMPOSITION OF A HIGH RESOLUTION IMAGE UTILIZING ITS LOW RESOLUTION REPLICA

CROSS-REFERENCE TO RELATED APPLICATION

U.S. patent application Ser. No. 359,910 was filed concurrently herewith.

TECHNICAL FIELD

This invention relates to transmission and/or storage of images and, more particularly, to efficient encoding/decoding of image information.

BACKGROUND OF THE INVENTION

Recently, there has been a rapid increase in the transmission and/or storage of image information and the like. This has been especially true in the use of facsimile. Additionally, use of high resolution monitors for generating a soft copy and/or browsing of the image information has resulted in additional requirements being placed on digital transmission and/or storage interfaces. In certain applications, rapid progression from a low resolution replica to a high resolution image is desirable and sometimes necessary. In order to improve encoding/decoding efficiency and speed, prior arrangements were employed which decomposed a high resolution image into a lower resolution replica and so-called supplemental information. The supplemental information was required to later recompose the low resolution replica into the high resolution image. In one known prior arrangement, supplemental information was generated only for pixels (picture elements) determined to be at a so-called "edge" in a resulting low resolution replica. Pixels not originally determined to be at an edge in the low resolution replica that were determined to require supplemental information were forced to be at an edge by modifying the image reduction rules. That is, the reduction rules were modified to force a pixel to be at an edge in the low resolution replica whenever the prediction rules would cause a decoder to otherwise improperly recompose the high resolution image. See, for example, our co-pending U.S. patent application Ser. No. 146,998, filed Jan. 22, 1988 now U.S. Pat. No. 4,870,497 issued Sept. 26, 1989 for one such prior arrangement.

A serious limitation of such a prior arrangement is that the prediction rules used to determine if supplemental information was required to be generated and encoded were based and dependent on the particular properties of the image reduction rules. Therefore, if the image reduction rules were changed, the prior prediction rules could not be used. Thus, any change in the image reduction rules would require development of a new set of prediction rules. This interdependence of the image reduction rules and the prediction rules is undesirable.

SUMMARY OF THE INVENTION

The limitations and other problems of the prior known prediction arrangements used in image decomposition and recomposition are overcome, in accordance with an aspect of the invention, by employing general prediction rules to determine if high resolution pixels to be recomposed from corresponding low resolution pixels in a low resolution replica representative of a high resolution image are so-called typically predictable pixels or so-called non-typically predictable pixels. The general prediction rules are also used, in accordance with an aspect of the invention, to determine particular ones of the so-called typically predictable pixels which would otherwise be improperly recomposed into corresponding high resolution pixels in the high resolution image. These pixels are identified as exceptions to the general prediction rules and an exception indication accompanies the corresponding low resolution pixel to indicate that the high resolution pixels cannot be properly recomposed using the general prediction rules. Supplemental information is required to properly recompose the non-typically predictable pixels and the typically predictable pixels which are exceptions to the general prediction rules into corresponding high resolution pixels in the high resolution image.

In recomposing the high resolution image, the general prediction rules are used to recompose high resolution pixels from corresponding low resolution pixels which are typically predictable. To recompose typically predictable pixels which are exceptions supplemental information is required. Non-typically predictable pixels also require supplemental information for proper recomposition.

DETAILED DESCRIPTION

Figure 1:
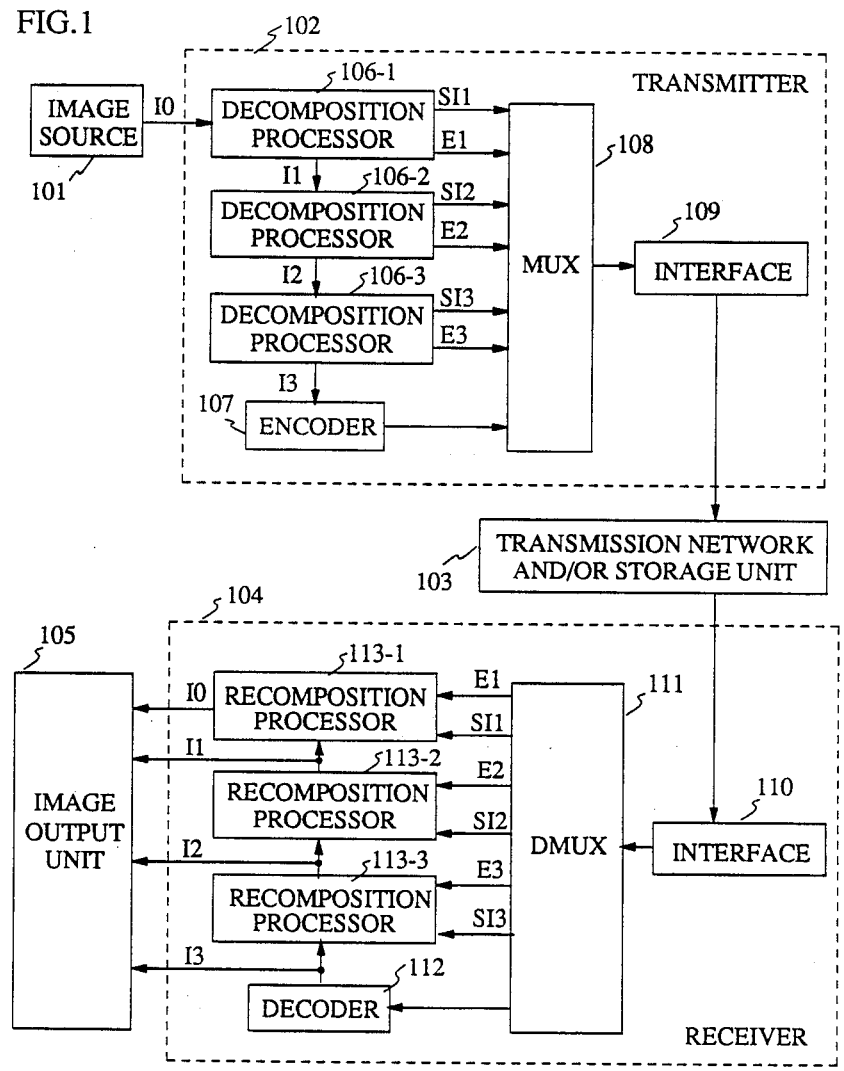
FIG. 1 shows, in simplified block diagram form, details of a progressive image transmission and/or storage system which advantageously employs aspects of the invention.

FIG. 1 shows, in simplified block diagram form, details of a progressive image transmission and/or storage system which advantageously employs aspects of the invention. Accordingly, shown are image source 101, transmitter 102, transmission network and/or storage unit 103, receiver 104 and image output unit 105.

Figure 2:
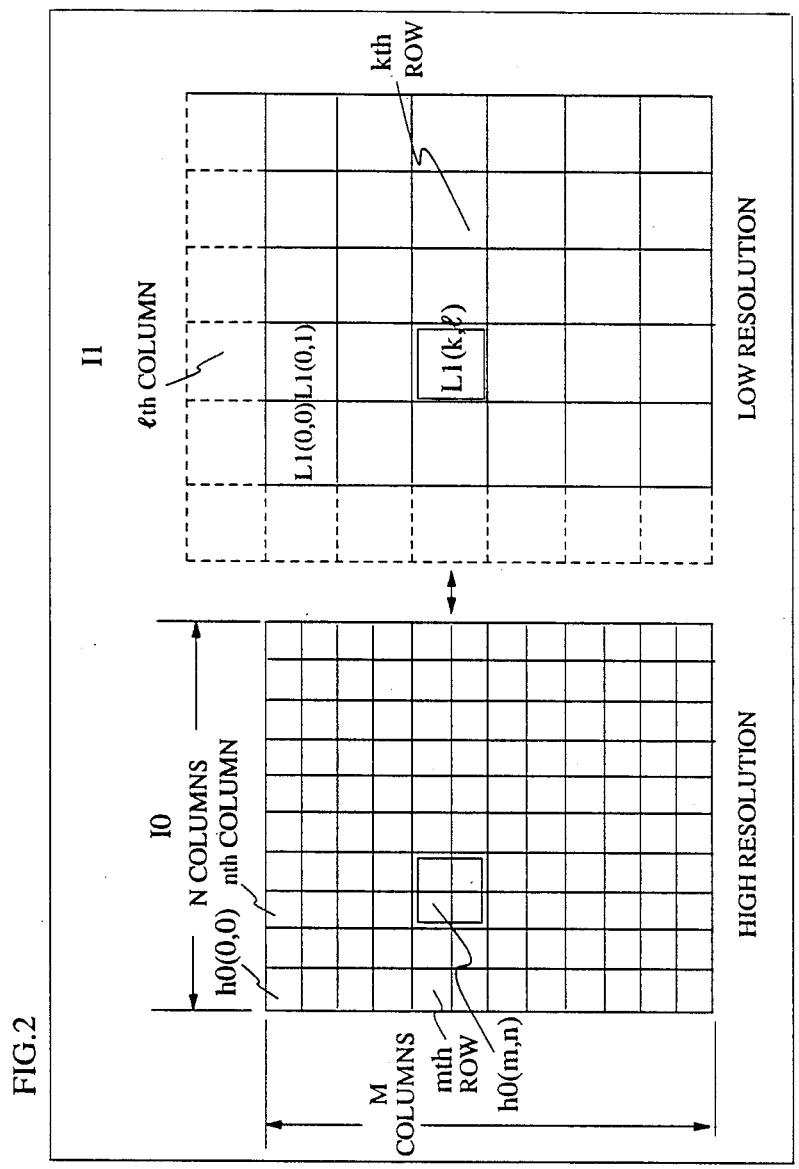
FIG. 2 depicts in graphic form a high resolution image and a corresponding low resolution replica useful in describing embodiments of the invention.

Image source 101 provides, in this example, a desired high resolution image and may be, for example, either a scanner or a data base. One such scanner which may advantageously be employed is manufactured by Cannon and is designated laser copier scanner NP-9030. The images to be transmitted may also be stored in a data base on, for example, either a magnetic disc or an optical disc. In this example, not to be construed as limiting the scope of the invention, the high resolution image I0 includes 400 dots per inch and has $M_0$ columns and $N_0$ rows and includes $M_0 \times N_0$ pixels, as shown in FIG. 2. A so-called super pixel in high resolution image I0 includes a block of "high" resolution pixels. Although any desired number of high resolution pixels from a plurality of columns and rows may be grouped to form a super pixel, in this example, it has been convenient to group four (4) high resolution pixels into a super pixel. Thus, in this example, a super pixel includes a block of four high resolution pixels, namely, $h0(m,n)$, $h0(m,n+1)$, $h0(m+1,n)$ and $h0(m+1,n+1)$, where m and n are the row and column indices, respectively, in the original high resolution image. In this example, when the Cannon scanner is employed to scan the original image, at 400 dots per inch, it yields $M_0=3456$ columns and $N_0=4672$ lines for an A4 standard size document.

The high resolution pixels are supplied from image source 101 to transmitter 102 and, therein, to decomposition processor 106-1. Decomposition processor 106-1 operates, as described below, to generate a low resolution replica I1 of the high resolution image, also shown in FIG. 2. Thus, the high resolution image I0 is decomposed into low resolution replica I1 having $M_1$ rows and $N_1$ columns plus supplemental information SI1 and exception E1. In this example, $M_1=M_0/2$, $N_1=N_0/2$ and the resolution of low resolution replica I1 is 200 dots/inch. As shown in FIG. 2, low resolution replica I1 has an imaginary reference column of pixels to the left of column $l=0$ and an imaginary reference row of pixels above row $k=0$, where l and k are the column and row indices, respectively. In this example, the pixels in the imaginary reference column and row are chosen to be white. The decomposition from high resolution image I0 to low resolution replica I1 is realized by replacing every super pixel including high resolution pixels $h0(m,n)$, $h0(m+1,n)$, $h0(m,n+1)$ and $h0(m+1,n+1)$ in image I0 with a single low resolution pixel $L1(k,l)$. The difference between the original high resolution image I0 and the low resolution replica I1 is the supplemental information SI1 required to upgrade the lower resolution replica into a higher resolution image. It should be noted that the supplemental information for low resolution pixels is generated, in accordance with an aspect of the invention, only for low resolution pixels corresponding to non-typically predictable high resolution pixels and for those low resolution pixels corresponding to typically predictable high resolution pixels and marked as exceptions. Generation of the supplemental information for non-typically predictable pixels and the typically predictable pixels which are exceptions, in accordance with aspects of the invention, is described below with respect to the decomposition process.

Transmitter 102 includes a number of decomposition processors, in this example, decomposition processors 106-1, 106-2 and 106-3. Although three decomposition processors are shown, in this example, it will be apparent that any desired number may be employed depending on the particular application. Indeed, a single decomposition process 106-1 could be employed, if desired. Each of decomposition processors 106-1 through 106-3 decomposes a "high" resolution image into a "low" resolution replica. As described above, FIG. 2 illustrates the relationship between the high resolution image I0 and the low resolution replica I1 generated by decomposition processor 106-1. The "high" resolution image supplied to decomposition processor 106-2 is low resolution replica I1 from decomposition processor 106-1. In turn, decomposition processor 106-2 generates low resolution replica I2 which, in turn, is supplied to decomposition processor 106-3 as its "high" resolution image. Decomposition processor 106-3 generates a so-called basic low resolution replica I3. The relationship between the pixels in each "high" resolution image and "low" resolution replica is identical to the relationship between pixels in I0 and I1 as shown in FIG. 2 and described above. That is, in this example, there is a 2 to 1 reduction in dots/inch and a 4 to 1 reduction in pixels for each decomposition generated by decomposition processors 106-1 through 106-3. Thus, the resolution of the basic low resolution replica I3, in this example, generated by decomposition processor 106-3 is 50 dots/inch.

The pixels L3(l,k) of the basic low resolution replica I3 are supplied to encoder 107. Encoder 107 encodes the pixels L3(l,k) in well-known fashion. Specifically, any one of several known CCITT or other standard encoding techniques may be employed. One CCITT encoding technique is described in INTERNATIONAL TELEPHONE AND TELEGRAPH CONSULTATIVE COMMITTEE (CCITT), "Facsimile Coding Schemes and Coding Control Functions for Group IV Facsimile Apparatus", Redbook, Facsimile VII.3, Rec.T.6, 1984, pages 40-48. Another encoder that may be employed is described in a co-pending U.S. patent application Ser. No. 359,559, filed concurrently herewith. The encoded pixel information is supplied to multiplexer (MUX) 108. Also, supplied to MUX 108 are encoded supplemental information and exception information from each of decomposition processors 106-1, 106-2 and 106-3, namely, encoded supplemental information SI1, SI2 and SI3, respectively, and encoded exception information E1, E2 and E3, respectively. MUX 108 combines the encoded basic pixel information, the encoded supplemental information and the encoded exception information, in well known fashion, for transmission and/or storage. To this end, it is noted that for transmission applications the encoded supplemental information SI1, SI2 and SI3 and the encoded exception information, E1, E2 and E3 are multiplexed in reverse sequential order. This is necessary because the lower resolution supplemental information and exception information, namely, SI3 and E3, in this example, are required first in recomposing to the original high resolution image.

The multiplexed signal is supplied to interface 109 which interfaces to transmission network and/or storage unit 103. The configuration of interface 109 is dependent on the particular transmission network and/or storage unit being employed. Such arrangements are known in the art.

The encoded image information is transmitted via a transmission network or obtained as desired from a storage unit and supplied to receiver 104 and therein via an appropriate interface 110 to demultiplexer (DMUX) 111. DMUX 111 demultiplexes, in well known fashion, the encoded basic low resolution pixel information, the encoded supplemental information and the encoded exception information. The encoded basic low resolution pixel information is supplied to decoder 112, which decodes it in known fashion. Decoder 112 must be compatible with encoder 107 and one such decoder is described in the article entitled "Facsimile Coding Schemes and Coding Control Functions for Group IV Facsimile Apparatus", cited above. Another decoder that may be employed is described in U.S. patent application Ser. No. 359,559, also cited above. The decoded pixel information for I3 is supplied to recomposition processor 113-3 and to image output unit 105. Also supplied to recomposition processor 113-3 are the encoded supplemental information SI3 and encoded exception information E3. Recomposition processor 113-3 is responsive to the basic low resolution pixel information for I3, the supplementary information SI3 and exception information E3 to recompose a "high" resolution image I2. The relationship of low resolution replica I3 to "high" resolution image I2 is identical, to I0 and I1, as shown in FIG. 2 and described above. Pixels of the recomposed "high" resolution image I2 are supplied to image output unit 105 and to recomposition processor 113-2. Also supplied to recomposition processor 113-2 are the encoded supplemental information SI2 and exception information E2. Recomposition processor 113-2 is responsive to the supplied low resolution pixel information for I2, supplemental information SI2 and exception information E2 to generate pixels forming "high" resolution image I1, in a manner identical to that employed in recomposition processor 113-3. The pixel information for image I1 is supplied to image output unit 105 and to recomposition processor 113-1. Again, also supplied to recomposition processor 113-1 are encoded supplemental information SI1 and encoded exception information E1. Recomposition processor 113-1 is responsive to the supplied pixel information for I1, supplemental information SI1 and exception information E1 to generate pixels forming the original high resolution image I0. The structure and operation of recomposition processor 113-1 and is identical to recomposition processors 113-2 and 113-3 and is described below. Pixels forming image I0 are supplied to image output unit 105.

Since pixel information for each of images I0, I1, I2 and I3 is supplied to image output unit 105, any one of the resolution levels can be selected, as desired, and the recomposition process can be stopped when an acceptable or desired resolution has been obtained.

Figure 3:
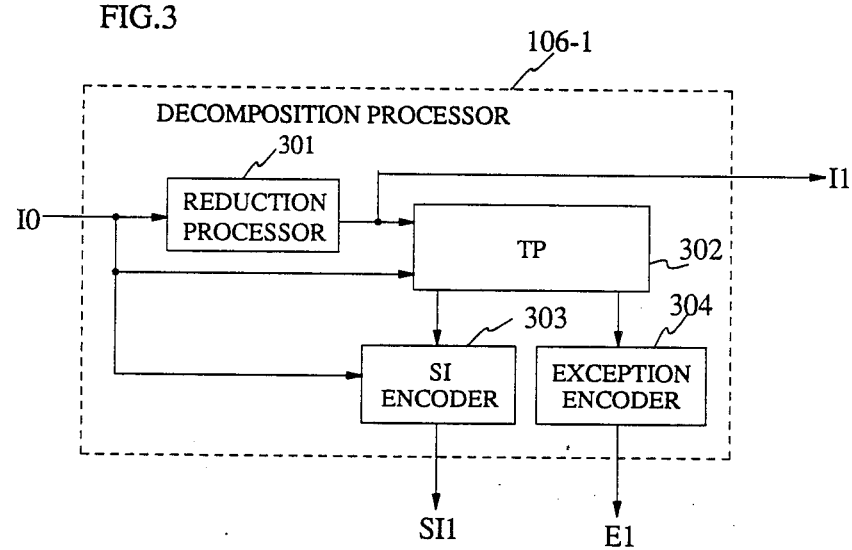
FIG. 3 shows, in simplified block diagram form, details of one of the decomposition processors employed in the embodiment of FIG. 1.

FIG. 3 shows, in simplified block diagram form, details of decomposition processor 106-1. Since the operation and structure of each of decomposition processors 106-1 through 106-3 is identical only decomposition processor 106-1 will be described in detail. Accordingly, decomposition processor 106-1 includes reduction processor 301, prediction processor (TP) 302, supplemental information (SI) encoder 303 and exception encoder 304. High resolution pixels from an image, in this example I0, are supplied to reduction processor 301, TP 302 and SI encoder 303. Reduction processor 301 yields low resolution pixels L1(k,l) of low resolution replica I1 from the supplied high resolution pixels. To this end, reduction processor 301 may employ any desired set of reduction rules. One possible set of reduction rules which may be employed is described in a document entitled "Progressive coding method for bi-level images", submitted to the Joint Bi-level Image Group and identified as ISO/JTC1/SC2/WG8, Document N-75, Dated Jan. 1989. SI encoder 303 and exception encoder 304 may be any of known encoders. Preferably, the encoders are of the arithmetic type which are known in the art. One such arithmetic encoder is described in the U.S. patent application Ser. No. 359,559, cited above.

TP 302 is employed, in accordance with an aspect of the invention, to determine typically predictable pixels, non-typically predictable pixels and typically predictable pixels that are exceptions to the general prediction rules. If so-called typically predictable high resolution pixels would be improperly recomposed from a corresponding low resolution pixel in conjunction with the general prediction rules, the corresponding low resolution pixel is marked by an exception. In turn, the exception is supplied to exception encoder 304 which generates encoded exception information E1. If the high resolution pixels to be recomposed from the low resolution pixel in conjunction with the general prediction rules are determined to be typically predictable and an exception or are non-typically predictable, TP 302 generates a supplemental information signal which is supplied to enable SI encoder 303 to encode the corresponding supplemental information SI1.

The operation of TP 302, in accordance with an aspect of the invention, in determining non-typically predictable pixels, typically predictable pixels which are not exceptions and typically predictable pixels which are exceptions to the general prediction rules is described below.

In this example, the color of the high and low resolution pixels is assumed to be either white represented by a logical "0" or black represented by a logical "1". It will be apparent that any other desired colors could equally be employed. Additionally, all the high resolution pixels are available, in this example, from an image source 101 and all the low resolution pixels are available from reduction processor 301. For subsequent ones of decomposition processors 106, the high resolution pixels are available from the prior one of decomposition processors 106.

Figure 4:
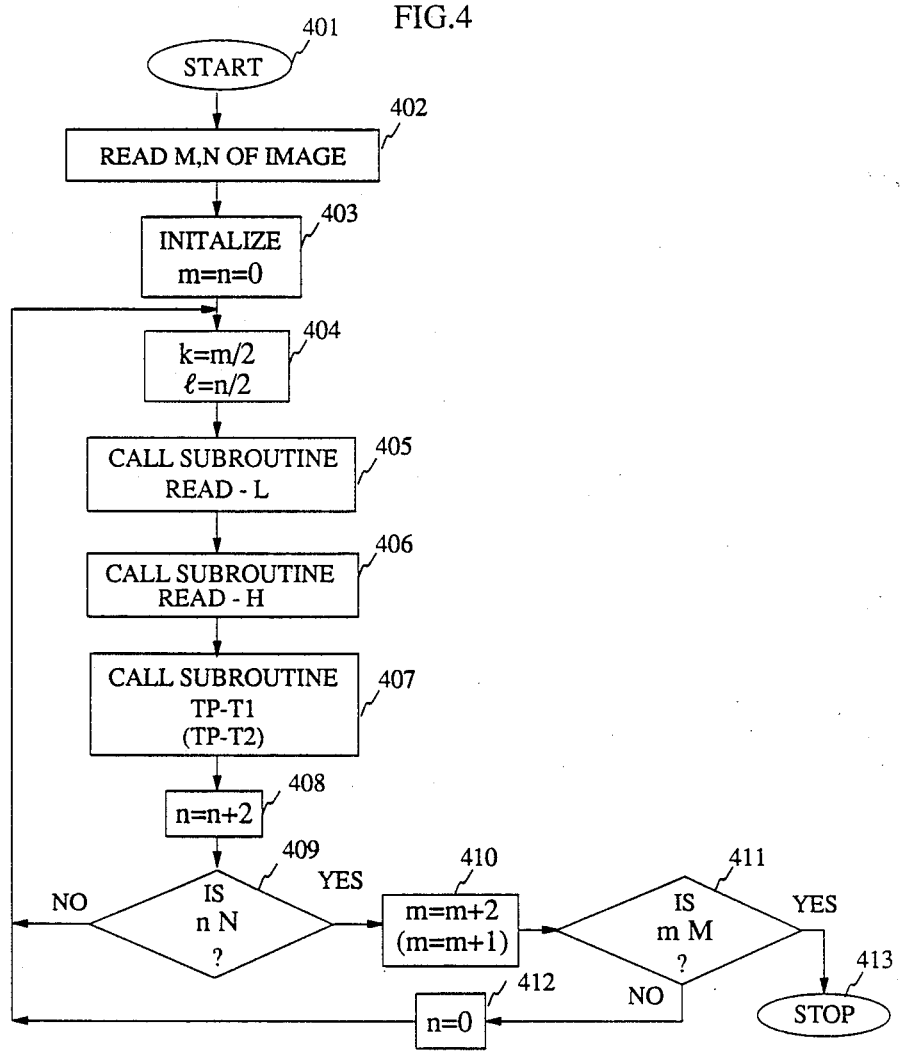
FIG. 4 illustrates a flow chart depicting the operation, in accordance with an aspect of the invention, of the decomposition processor implementation of FIG. 3.

FIG. 4 is a flow chart illustrating the operation of decomposition processor 106-1. Accordingly, the operational process is entered via start step 401. Thereafter, operational block 402 reads the number of rows M and columns N to be obtained from image source 101 or from a prior one of decomposition processors 106. Operational block 403 initializes the row (m) and column (n) indices in the high resolution image I0, namely, $m=n=0$. Operational block 404 initializes the row (k) and column (l) indices in the low resolution replica I1 to be generated, namely, $k=m/2$ and $l=n/2$.

Figure 5:
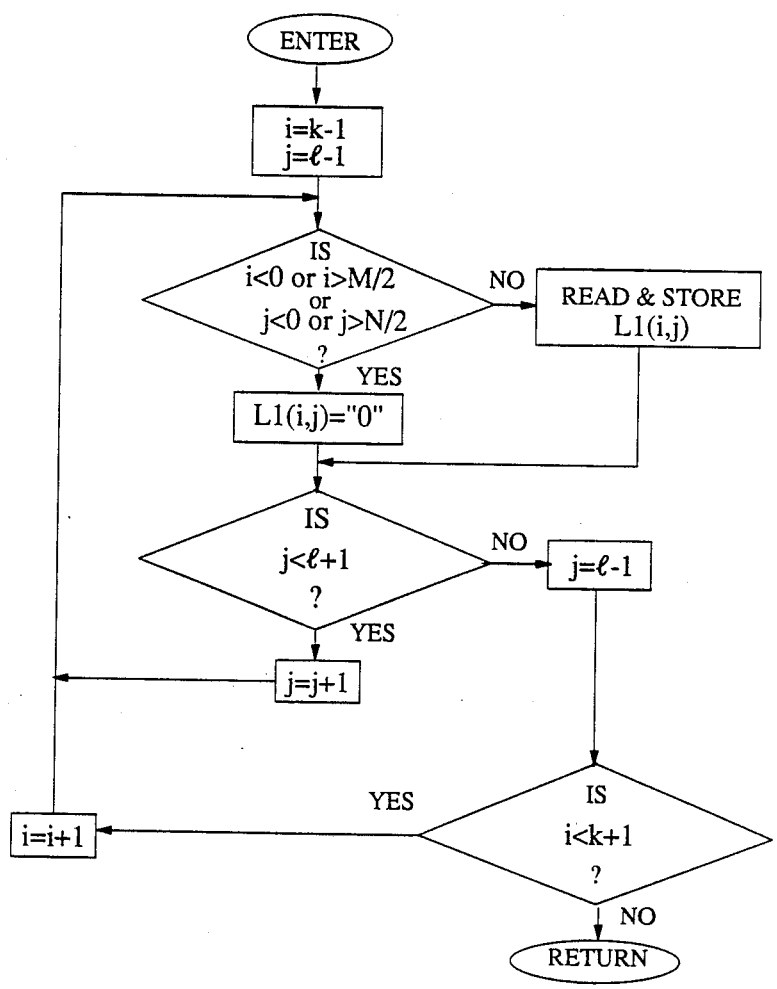
FIG. 5 depicts a flow chart of subroutine READ-L employed in the operation of the decomposition processor illustrated in the flow chart of FIG. 4.

Operational block 405 calls subroutine READ-L. FIG. 5 shows a flow chart of subroutine READ-L which is employed to read and store the "color" of the low resolution pixels L1(i,j) generated by reduction processor 301 for low resolution replica I1. In this example, the color of the pixels is assumed to be either white or black. Indices i and j are dummy variables which, in this example, are initially set to $i=k-1$ and $j=l-1$, respectively, and where k and l are the row and column indices, respectively, in the low resolution replica (FIG. 2). Thus, referring to FIG. 5, it will be apparent that subroutine READ-L causes the "color" to be read and stored of each of low resolution pixels L1(i,j) in a group in a neighborhood of low resolution pixel L1(k,l). The group is defined, in this example, by values of i from $k-1$ to $k+1$ and by values of j from $l-1$ to $l+1$. It is noted that if a pixel L1(i,j) is outside the boundary of low resolution replica I1, it is assigned a predetermined color which, in this example, is white.

Figure 6:
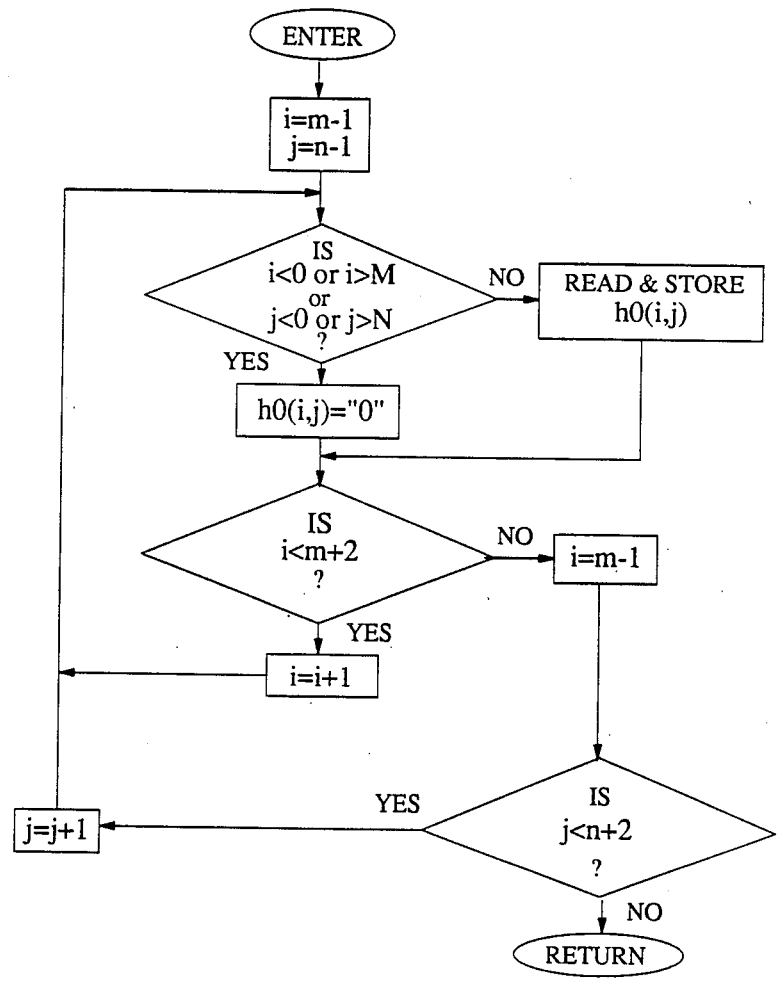
FIG. 6 is a flow chart of subroutine READ-H also used in the operation of the decomposition processor illustrated in the flow chart of FIG. 4.

Returning to FIG. 4, operational block 406 calls subroutine READ-H. FIG. 6 shows a flow chart of subroutine READ-H which is employed to read and store the "color" of high resolution pixels h0(i,j) from high resolution image I0. Again, all the high resolution pixels are available from image source 101. For a different one of decomposition processors 106, the high resolution pixels are available from a prior one of the decomposition processors 106. Indices i and j are dummy variables which, in this example, are initially set to $i=m-1$ and $j=n-1$, where m and n are the row and column indices, respectively, in the high resolution image (FIG. 2). Thus, referring to FIG. 6, it will be apparent that subroutine READ-H causes the "color" to be read and stored of each of high resolution pixels h0(i,j) in a group in a neighborhood of high resolution pixel h0(m,n). The group is defined, in this example, by values of i from $m-1$ to $m+2$ and by values of j from $n-1$ to $n+2$. Again, if a pixel h0(i,j) is outside the boundary of high resolution image I0, it is assigned a predetermined color which, in this example, is white.

Returning again to FIG. 4, operation block 407 calls either subroutine TP-T1 or (TP-T2) to effect the determination, in accordance with an aspect of the invention, of whether high resolution pixels to be recomposed from the corresponding low resolution pixel in conjunction with the general prediction rules are typically predictable without an exception, typically predictable and an exception, or non-typically predictable to generate appropriate signals which are supplied to SI encoder 303 and exception encoder 304. Subroutine TP-T1 is used in a first embodiment of TP 302 and subroutine TP-T2 is used in second embodiment of TP 302. Subroutine TP-T is a generic subroutine for purposes of describing the invention. These subroutines are described below. Again, step 407 is effected for a particular low resolution pixel L1(k,l) to determine if the corresponding high resolution pixels are typically predictable, non-typically predictable or typically predictable which are exceptions to the general prediction rules.

Operational block 408 increments the high resolution image column index n, namely, $n=n+2$. The reason for incrementing n by two (2) is that, in this example, the low resolution pixel being generated is derived from a super pixel including high resolution pixels from two columns and two rows in the high resolution image.

Conditional branch point 409 tests to determine if an end of a row has been reached, if the test result is NO, steps 404 through 409 are repeated until step 409 yields a YES result. Thereafter, operational block 410 increments the high resolution image row index m. For example one, i.e., TP-T1, to be described below, row index m is incremented by two (2). For example two, i.e., TP-T2, to be described below, row index m is incremented by one (1). Conditional branch point 411 tests to determine if the last row in the high resolution image has been completed. If the test result in step 411 is NO, operational block 412 sets the high resolution image column index n equal to zero (0) and appropriate ones of steps 404 through 412 are repeated until step 411 yields a YES result. This YES result from step 411 indicates that the high resolution image is completed and the process is stopped via step 413.

Figure 7:
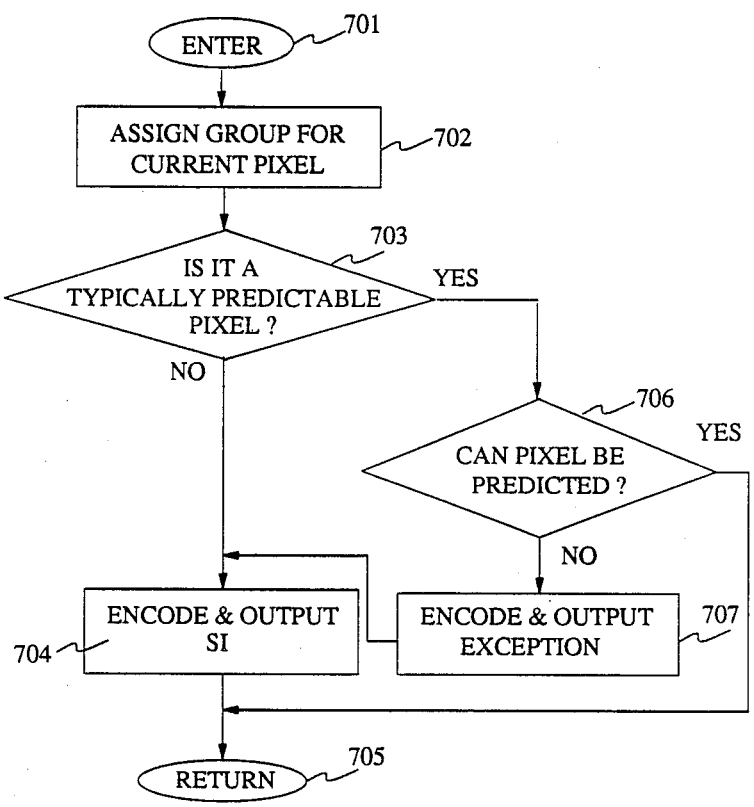
FIG. 7 is a flow chart of a generic version of subroutine TP-T used in the operation of the decomposition processor illustrated in the flow chart of FIG. 4 which, in accordance with an aspect of the invention, determines non-typically predictable pixels, typically predictable pixels and exceptions to the typically predictable pixels.

Referring to FIG. 7, there is shown a flow chart of a generic version of subroutine TP-T which illustrates the general operation of an embodiment of the invention in determining if high resolution pixels to be recomposed from a particular low resolution pixel L1(k,l) in conjunction with the general prediction rules are non-typically predictable, typically predictable and not an exception or typically predictable and an exception, in accordance with an aspect of the invention. Accordingly, the process is entered via step 701. Thereafter, operational block 702 assigns a so-called group of pixels which are to be employed in testing a current low resolution pixel L1(k,l). Conditional branch point 703 employs the assigned group of pixels to determine, in accordance with the general prediction rules, if the high resolution pixels to be recomposed corresponding to low resolution pixel L1(k,l) are typically predictable. If the test result in step 703 is NO, the high resolution pixels to be recomposed corresponding to L1(k,l) are non-typically predictable, and operational block 704 causes an encode supplemental information output signal to be supplied to SI encoder 303 (FIG. 3) enabling it to encode and output supplemental information SI1 corresponding to the current low resolution pixel L1(k,l) being processed. Then, control is returned to the main routine of FIG. 4 via step 705. If the test result in step 703 is YES, the high resolution pixels to be recomposed corresponding to pixel L1(k,l) are typically predictable, and conditional branch point 706 determines, in accordance with an aspect of the invention, if when using the general prediction rules the high resolution pixels would be properly recomposed. If the test result in step 706 is YES, the high resolution pixels corresponding to the current low resolution pixel L1(k,l) are predictable and control is returned to the main routine of FIG. 4 via step 705. If the test result in step 706 is NO, the high resolution pixels corresponding to the current low resolution pixel L1(k,l) would not be properly recomposed and operational block 707 causes the current low resolution pixel L1(k,l) to be marked by an exception, thereby indicating that supplemental information is required. In turn, exception encoder 305 (FIG. 3) encodes and supplies as an output exception E1. In this example, the exception E1 includes the row and column indices me and ne corresponding to the high resolution pixels that are exceptions. Additionally, step 704 enables SI encoder 303 (FIG. 3) to encode and output the supplemental information SI1 for the current low resolution pixel L1(k,l). Then, control is returned to the main routine (FIG. 4) via step 705.

Figure 8:
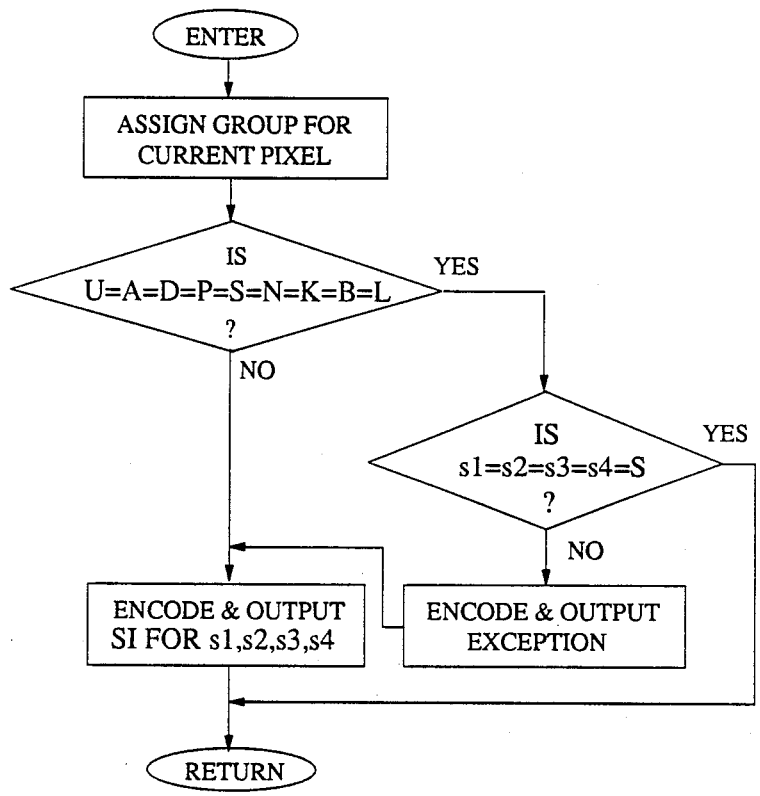
FIG. 8 is a flow chart of subroutine TP-T1 used in the operation of a first illustrative embodiment of the decomposition processor illustrated in the flow chart of FIG. 4 which, in accordance with an aspect of the invention, determines non-typically predictable pixels, typically predictable pixels and exceptions to the typically predictable pixels.
Figures 9, 10:
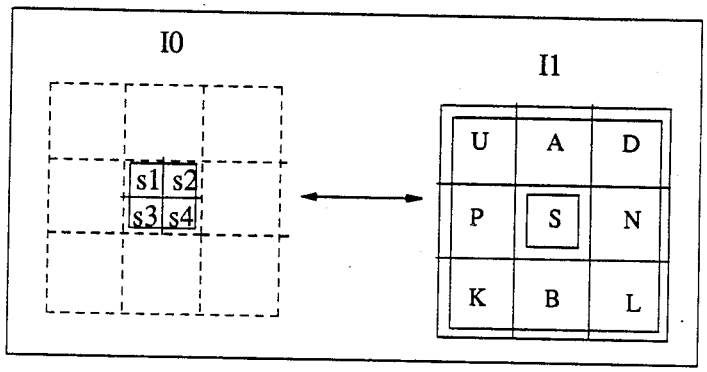
FIG. 9 is a graphical representation of portions of a high resolution image and a low resolution replica useful in describing aspects of the invention.
FIG. 10 is a table depicting a so-called group pixel assignment and super pixel assignment useful in describing an embodiment of the invention.

FIG. 8 shows a flow chart of subroutine TP-T1 illustrating operation of a first embodiment of the invention. In this embodiment, a first group of pixels is assigned to be used in conjunction with the current low resolution pixel L1(k,l), in accordance with an aspect of the invention, to determine if the corresponding high resolution pixels to be recomposed are typically predictable, non-typically predictable or typically predictable which are exceptions to the general prediction rules. The group of pixels assigned, in this example, is graphically illustrated in FIG. 9. The row and column locations of the pixels of the assigned group in the low resolution replica and the super pixel assignments in the high resolution image are shown in FIG. 10. Thus, in low resolution replica I1 the group includes low resolution pixels labeled U, A, D, P, N, K, B and L surrounding the current low resolution pixel labeled S. In high resolution image I0 the pixels are, in this example, the high resolution pixels forming the high resolution super pixel being decomposed into the current low resolution pixel labeled S, namely, s1, s2, s3 and s4.

Returning to the flow chart of FIG. 8, operation of this embodiment of the invention as illustrated in subroutine TP-T1 is in accordance with the following:

(a) High resolution pixels to be recomposed from the current low resolution pixel labeled S in conjunction with the general prediction rules are typically predictable and not an exception, if $U=A=D=P=S=N=K=B=L$ and $s1=s2=s3=s4=S$.

(b) High resolution pixels to be recomposed from the current low resolution pixel S in conjunction with the general prediction rules are typically predictable and an exception, if $U=A=D=P=S=N=K=B=L$ and the color of any s1, s2, s3 or s4 is not the same as S. Then, the low resolution pixel labeled S is marked by an exception, an exception E1 is encoded and supplied as an output, and the colors of s1, s2, s3 and s4 are encoded and supplied as supplemental information output SI1.

(c) High resolution pixels to be recomposed from the current low resolution pixel S in conjunction with the general prediction rules are non-typically predictable, if the color of any of U, A, D, P, N, K, B or L is not the same as S. Again, the colors of s1, s2, s3 and s4 are encoded and supplied as supplemental information output SI1.

As indicated above, the supplemental information to be encoded includes the colors of the high resolution pixels s1, s2, s3 and s4. Since it is assumed, in this example, that each high resolution pixel can be either black or white, there are sixteen possible combinations of colors for the high resolution pixels. The supplemental information (SI1) being generated for the current low resolution pixel S is a binary number depending on the colors of high resolution pixels s1, s2, s3 and s4. By way of an example, if s1 is white, s2 is black, s3 is white and s4 is black, and since white is a logical "0" and black is a logical "1", the supplemental information SI1=0101 (binary). It is this supplemental information that is encoded by encoder 303 (FIG. 3) and supplied as output SI1.

Additionally, in this example, the exception E1 is representative of the row and column indices m and n, respectively, of one of the high resolution pixels, namely, s1, in the high resolution super pixel corresponding to the current low resolution pixel labeled S.

Again, the advantage of employing this aspect of the invention is that the prediction rules are independent of the image reduction rules and less information has to be encoded, and, subsequently, decoded.

Figure 11:
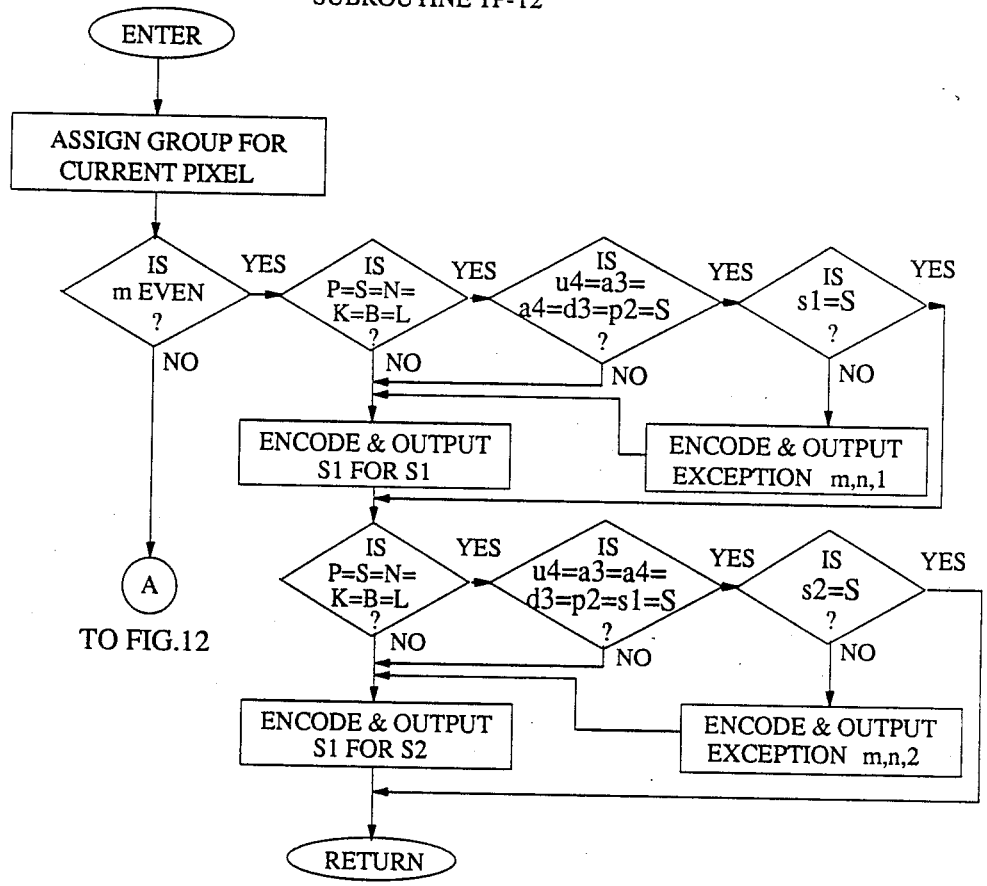
FIG. 11 and FIG. 12 when connected A—A form a flow chart of subroutine TP-T2 used in the operation of a second illustrative embodiment of the decomposition processor shown in the flow chart of FIG. 4 which, in accordance with an aspect of the invention, determines non-typically predictable pixels, typically predictable pixels and exceptions to the typically predictable pixels.
Figure 12:
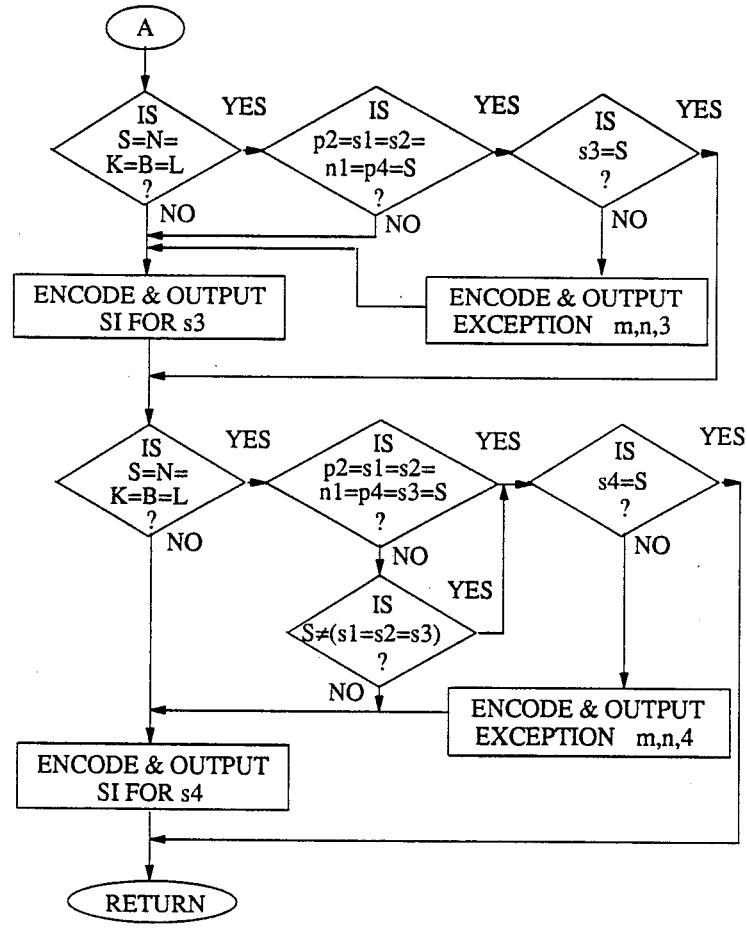
Figures 13, 14:
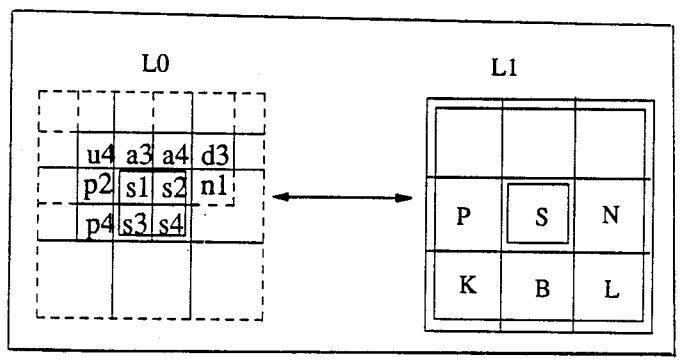
FIG. 13 is graphical representation of portions of a high resolution image and a low resolution replica useful in describing aspects of the invention.
FIG. 14 is a table depicting a so-called group assignment useful in describing an embodiment of the invention.

FIGS. 11 and 12 when connected A—A form a flow chart of subroutine TP-T2 illustrating the operation of a second embodiment of the invention. It is noted that, in this example, the determination of an exception to the general prediction rules, i.e., whether a high resolution pixel to be recomposed can be typically predicted, is done on an individual high resolution pixel basis for each of the high resolution pixels s1, s2, s3, s4 forming the super pixel which is being decomposed into the current low resolution pixel L1(k,l)=S. It is also noted, as indicated in FIG. 4 step 410, that the processing of the high resolution pixels is on a row-by-row basis, i.e. row index m is incremented by one (1). In this embodiment, a second group of pixels is assigned to be used in conjunction with the current low resolution pixel L1(k,l), in accordance with an aspect of the invention, to determine if corresponding high resolution pixels to be recomposed are non-typically predictable, typically predictable and not an exception or typically predictable and an exception to the general prediction rules. The group of pixels assigned, in this example, is graphically illustrated in FIG. 13. Thus, in low resolution replica I1 the group includes low resolution pixels labeled P, N, K, B and L in the neighborhood of the current low resolution pixel labeled S. In the high resolution image the group includes u4, a3, a4, d3, p2, s1, s2, n1, p4, s3 and s4. Again, s1, s2, s3 and s4 form a super pixel in the high resolution image I0 being decomposed to the current low resolution pixel labeled S. The row and column locations of the pixels of the assigned group in the respective low resolution replica and high resolution image are shown in FIG. 14.

Returning to the flow chart of FIGS. 11 and 12, operation of this embodiment of the invention as illustrated in subroutine TP-T2 is in accordance with the following:

1. (a) A first high resolution pixel, e.g., s1, is typically predictable and not an exception, and can be predicted from the current low resolution pixel in conjunction with the general prediction rules, if (see FIG. 13) u4=a3=a4=d3=p2=P=S=N=K=B=L and s1=S.

(b) High resolution pixel s1 is typically predictable and an exception, and cannot be predicted in conjunction with the general prediction rules, if u4=a3=a4=d3=p2=P=S=N=K=B=L and of s1≠S. Then, the color of s1 is encoded and supplied as supplemental information output SI1 and an exception representative of the row and column indices m and n, respectively, for s1 is encoded and supplied as exception output E1 (FIG. 3).

(c) High resolution pixel s1 is non-typically predictable, if the color of any of u4, a3, a4, d3, p2, P, N, K, B or L is not the same as S. Then, the color of s1 is encoded and supplied as supplemental information output SI1.

2. (a) A second high resolution pixel, e.g., s2, is typically predictable and not an exception, and can be predicted from the current low resolution pixel S in conjunction with the general prediction rules, if (see FIG. 13) of u4=a3=a4=d3=p2=s1=P=S=N=K=B=L and s2=S.

(b) High resolution pixel s2 is typically predictable and an exception, and cannot be predicted in conjunction with the general prediction rules, if u4=a3=a4=d3=p2=s1=P=N=K=B=L and s2≠S. Then, the color of S2 is encoded and supplied as supplemental information output SI1 and an exception representative of the row and column indices m and n, respectively, for s2 is encoded and supplied as exception output E1 (FIG. 3).

(c) High resolution pixel s2 is non-typically predictable if the color of any of u4, a3, a4, d3, p2, s1, P, N, K, B or L is not the same as S. Then, the color of s2 is encoded and supplied as supplemental information output SI1.

3. (a) A third high resolution pixel, e.g., s3, is typically predictable and not an exception, and can be predicted from the current low resolution pixel S in conjunction with the general prediction rules, if (see FIG. 13) p2=s1=s2=n1=p4=S=N=K=B=L and s3=S.

(b) High resolution pixel s3 is typically predictable and an exception, and cannot be predicted in conjunction with the general prediction rules, if p2=s1=s2=n1=p4=S=N=K=B=L and s3≠S. Then, the color of s3 is encoded and supplied as supplemental information output SI1 and an exception representative of the row and column indices m and n, respectively, for s3 is encoded and supplied as exception output E1 (FIG. 3).

(c) High resolution pixel s3 is non-typically predictable if the color of any of p2, s1, s2, n1, p4, N, K, B or L is not the same as S. Then, the color of s3 is encoded and supplied as supplemental information output SI1.

4. (a) A fourth high resolution pixel, e.g., s4, is typically predictable and not an exception, and can be predicted from the current low resolution pixel S in conjunction with the general prediction rules, if (see FIG. 13) p2=s1=s2=n1=p4=s3=S=N=K=B=L and s4=S, or if S=N=K=B=L and any color of p2, s1, s2, n1, p4 or s3 is not the same as S and the colors of s1, s2, and s3 are the same and different from the color of S, i.e., (s1=s2=s3)≠S and s4=S.

(b) High resolution pixel s4 is typically predictable and an exception, and cannot be predicted in conjunction with the general prediction rules, if p2=s1=s2=n1=p4=s3=N=K=B=L and s4≠S, or if S=N=K=B=L and any color of p2, s1, s2, n1, p4 or s3 is not the same as S and (s1=s2=s3)≠S and s4≠S. Then, the color of s4 is encoded and supplied as supplemental information output SI1 and an exception representative of the row and column indices m and n, respectively, for s4 is encoded and supplied as exception output E1.

(c) High resolution pixel s4 is non-typically predictable when the color of any of N, K, B or L is not the same as S, or if N=K=B=L=S and the color of any of p2, s1, s2, n1, p4 or s3 is not the same as S and s1=s2=s3=S. Again, the color of high resolution pixel s4 is encoded as the supplemental information SI1.

Since, it is assumed, in this example, that the color of the pixels is either white represented by a logical "0" or black represented by a logical "1", the encoded supplemental information output SI1 is representative of either a logical "0" or a logical "1" depending on the color of the corresponding high resolution pixel.

The advantage of this embodiment is that the only supplemental information being encoded is the individual high resolution pixels corresponding to the current low resolution pixel marked as an exception. It is noted that exceptions to the general prediction rules are a relatively rare occurrence. For example, exceptions occur on average only once for every 10,000 typically predictable pixels.

Figure 15:
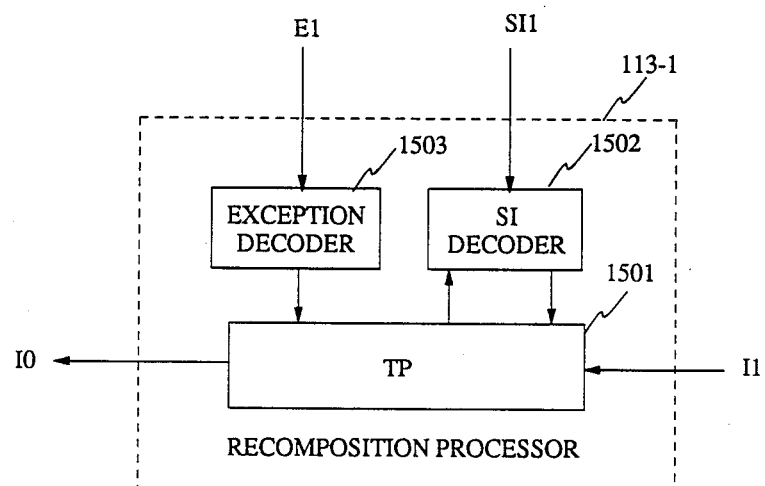
FIG. 15 shows, in simplified block diagram form, details of one of the recomposition processors employed in the embodiment of FIG. 1.

FIG. 15 shows, in simplified block diagram form, details of recomposition processor 113-1. Since the operation and structure of each of recomposition processors 113-1 through 113-3 is identical, only recomposition processor 113-1 will be described in detail. Accordingly, recomposition processor 113-1 includes prediction processor (TP) 1501, supplemental information (SI) decoder 1502 and exception decoder 1503. Low resolution pixels representative of low resolution replica I1 are, in this example, supplied to decomposition processor 113-1 from prior recomposition processor 113-2. If the particular one of recomposition processors 113 is the first or an only one in a series, the low resolution pixels are obtained from transmission network and/or storage unit 103 (FIG. 1) via DMUX 111 and decoder 112. Encoded supplemental information SI1 is supplied from DMUX 111 (FIG. 1) to SI decoder 1502 and encoded exception information E1 is also supplied from DMUX 111 to exception decoder 1503. SI decoder 1502 must be compatible with SI encoder 303 employed in decomposition processors 106. Similarly, exception decoder 1503 must be compatible with exception encoder 304 also used in decomposition processors 106. Preferably, decoders 1502 and 1503 are of the arithmetic type which are known in the art. One such arithmetic decoder is described in the U.S. patent application Ser. No. 359,559, cited above.

TP 1501 is employed, in accordance with an aspect of the invention, to determine which of the high resolution pixels are to be recomposed in accordance with the current low resolution pixel L1(k,l)=S and the general prediction rules, and which high resolution pixels are to be recomposed in response to an exception and corresponding supplemental information. Again, decoded supplement information is obtained from SI decoder 1502 and decoded exception information is obtained from exception decoder 1503.

Operation of TP 1501 in recomposing high resolution pixels, in accordance with an aspect of the invention, is described below. In this example, it is noted that all the low resolution pixels L1(k,l) for low resolution replica I1 are available and that all high resolution pixels h0(m,n) recomposed prior to the current high resolution pixel being recomposed are available.

Figure 16:
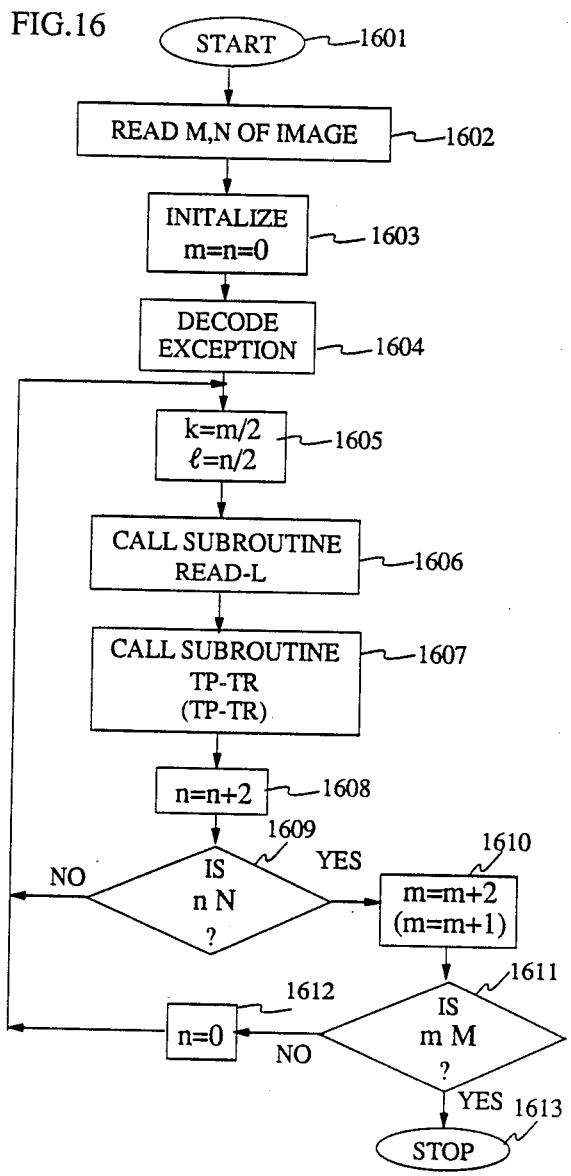
FIG. 16 illustrates a flow chart showing the operation, in accordance with aspects of the invention, of the recomposition processor implementation of FIG. 15.

Referring to FIG. 16, the operation of TP 1501 is begun via start step 1601. Then, operational block 1602 obtains the number of rows M and columns N of the high resolution image I0 being recomposed. Operational block 1603 initializes the row and column indices m and n, respectively, of high resolution image I0, namely, m=n=0. Operational block 1604 causes the first exception to be decoded. Operational block 1605 sets the low resolution image I1 row and column indices k and l, respectively, to be k=m/2 and l=n/2. Operation block 1606 calls subroutine READ-L (FIG. 5) to obtain, as described above, prescribed ones of the low resolution pixels of low resolution replica I1 to be used in the subroutines of step 1607.

Operational block 1607 calls either subroutine TP-R1 or (TP-R2) to effect the determination, in accordance with an aspect of the invention, of whether the high resolution pixels being recomposed are to be recomposed in accordance with the general prediction rules, or in response to an exception and corresponding supplemental information SI1. Subroutine TP-R1 is used in a first embodiment of TP 1501 and subroutine TP-R2 is used in a second embodiment of TP 1501. Subroutine TP-R is a generic version for purposes of describing the operation of the invention. These subroutines are described below. It is noted that step 1607 is effected for a particular low resolution pixel L1(k,l) to determine if the corresponding high resolution pixels being recomposed are to be recomposed in accordance with the general prediction rules, or in response to an exception and the corresponding supplemental information SI.

Operational block 1608 increments the high resolution image column index n, namely, n=n+2. Conditional branch point 1609 tests to determine if an end of a row in the high resolution image has been reached. If the test result in step 1609 is NO, steps 1605 through 1609 are repeated until step 1609 yields a YES result. Then, operational block 1610 increments the high resolution image row index m. For subroutine TP-R1, row index m is incremented by two (2), and for subroutine TP-R2, row index m is incremented by one (1). Conditional branch point 1611 tests to determine if the last row in the high resolution image has been completed. If the test result in step 1611 is NO, operational block 1620 sets the high resolution column index to n=0 and appropriate ones of steps 1605 through 1612 are repeated until step 1611 yields a YES result. Thereafter, the process is ended via step 1613.

Figure 17:
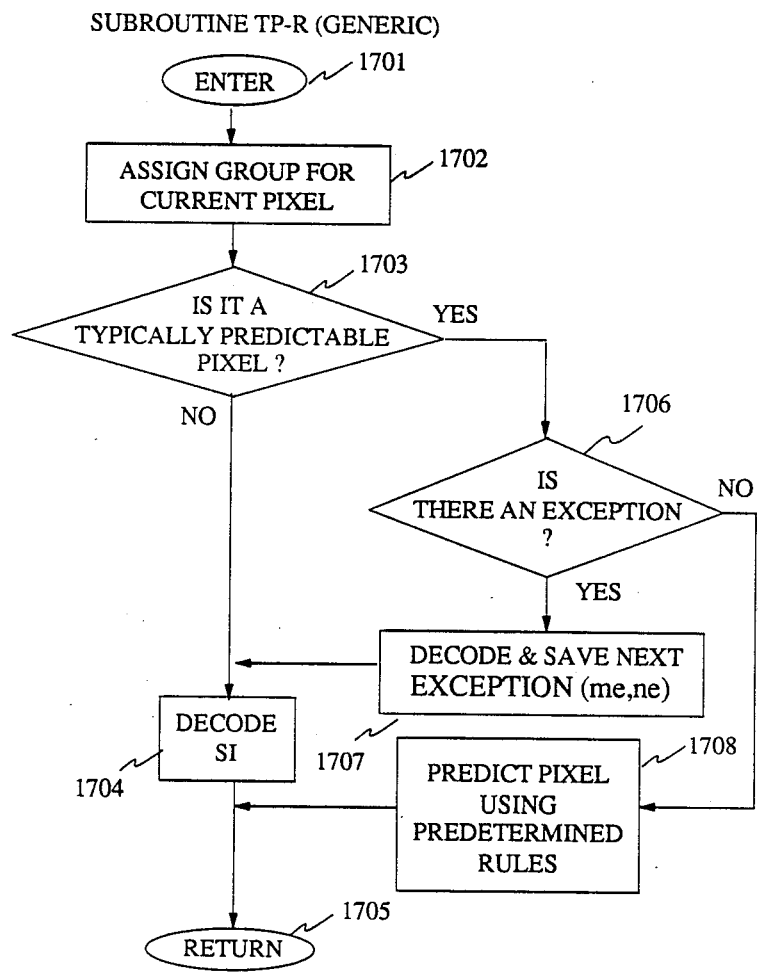
FIG. 17 is a flow chart of a generic version subroutine TP-R used in the operation of the recomposition processor shown in FIG. 15 which, in accordance with an aspect of the invention, determines non-typically predictable pixels, typically predictable pixels and exceptions to the typically predictable pixels.

Referring to FIG. 17, there is shown a flow chart of a generic version of subroutine TP-R which illustrates the generic operation of an embodiment of the invention in determining if high resolution pixels being recomposed are recomposed from the current low resolution pixel, L1(k,l)=S in conjunction with general prediction rules, or in response to an exception and corresponding supplemental information SI1. Accordingly, the process is entered via step 1701. Then, operational block 1702 assigns a so-called group of pixels for use in conjunction with the current low resolution pixel. Conditional branch point 1703 employs the assigned group of pixels in accordance with the general prediction rules to determine, in accordance with an aspect of the invention, if the high resolution pixel (pixels) to be recomposed corresponding to the current low resolution pixel are typically predictable. If the test result in step 1703 is NO, the high resolution pixels to be recomposed from the current low resolution pixel labeled S are non-typically predictable and operational block 1704 causes the corresponding supplemental information SI1 to be decoded. Then, control is returned via step 1705 to the main routine of FIG. 16. If the test result in step 1703 is YES, the high resolution pixels to be recomposed for the current low resolution pixel S are typically predictable, and conditional branch point 1706 tests to determine if there is an exception. If the test result in step 1706 is NO, operational block 1708 predicts the high resolution pixels according to the general prediction rules and, then, control is returned to the main routine via step 1706. If the test result in step 1705 is YES, there is an exception and operational block 1707 causes a next exception to be decoded and stored for later use. Additionally, step 1704 causes the decoding of the supplemental information SI1 corresponding to the low resolution pixel marked by the exception. Thereafter, control is returned to the main routine of FIG. 16 via step 1705.

Figure 18:
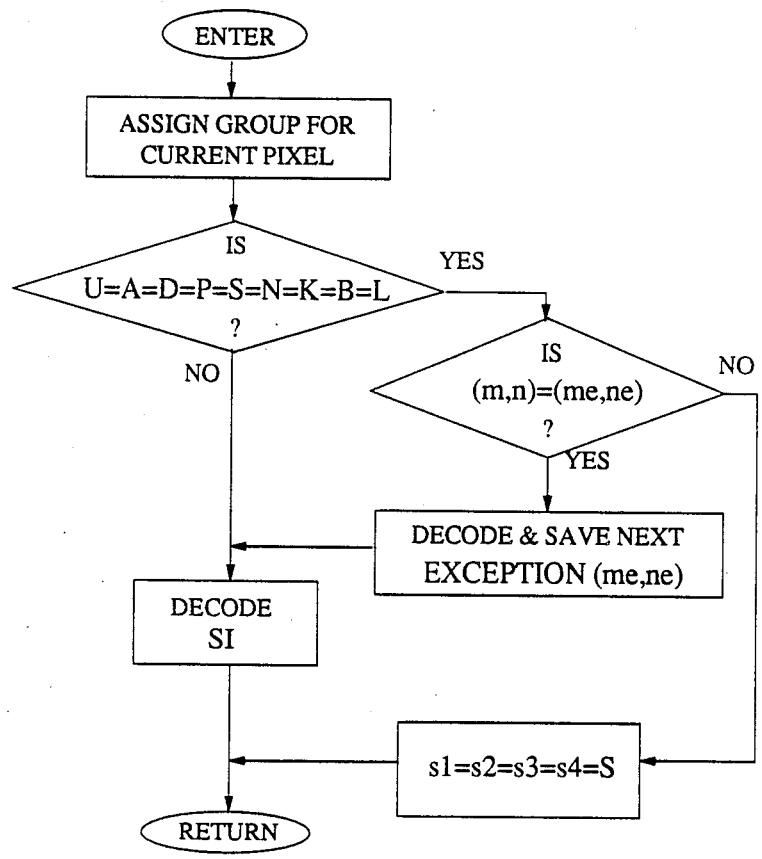
FIG. 18 is a flow chart of subroutine TP-R1 used in the operation of another illustrative embodiment of the recomposition processor illustrated in the flow chart of FIG. 16 which, in accordance with an aspect of the invention, determines non-typically predictable pixels, typically predictable pixels and exceptions to the typically predictable pixels.

FIG. 18 shows a flow chart of subroutine TP-R1 illustrating operation of a another embodiment of the invention. In this embodiment, the first group of pixels is assigned to be used in conjunction with general prediction rules to determine if the high resolution pixels to be recomposed for the current low resolution pixel L1(k,l)=S are, in accordance with an aspect of the invention, typically predictable and, if typically predictable, whether an exception to the general prediction rules. The group of pixels assigned, in this example, is graphically illustrated in FIG. 9 and includes the low resolution pixels labeled U, A, D, P, N, K, B and L in the neighborhood of the current low resolution pixel labeled S. The row and column indices of the corresponding low resolution pixels and the high resolution pixels in a high resolution super pixel are shown in FIG. 10.

Returning to the flow chart of FIG. 18, operation of this embodiment of the invention as illustrated in subroutine TP-R1 is in accordance with the following:

(a) High resolution pixels to be recomposed for the current low resolution pixel S are typically predictable, if U=A=D=P=S=K=B=L, and if there is no corresponding exception, the colors of the high resolution pixels in the super pixel are s1=s2=s3=s4=S. If there is an exception, the next exception is decoded and saved for later use, and the corresponding supplemental information SI1 is decoded to obtain the colors of high resolution pixels s1, s2, s3 and s4.

(b) High resolution pixels to be recomposed for the current low resolution pixel S are non-typically predictable, if the color of any of U, A, D, P, K, B, or L is not the same as S. Then, the corresponding supplemental information SI1 is decoded to obtain the colors of high resolution pixels s1, s2, s3 and s4.

Figure 19:
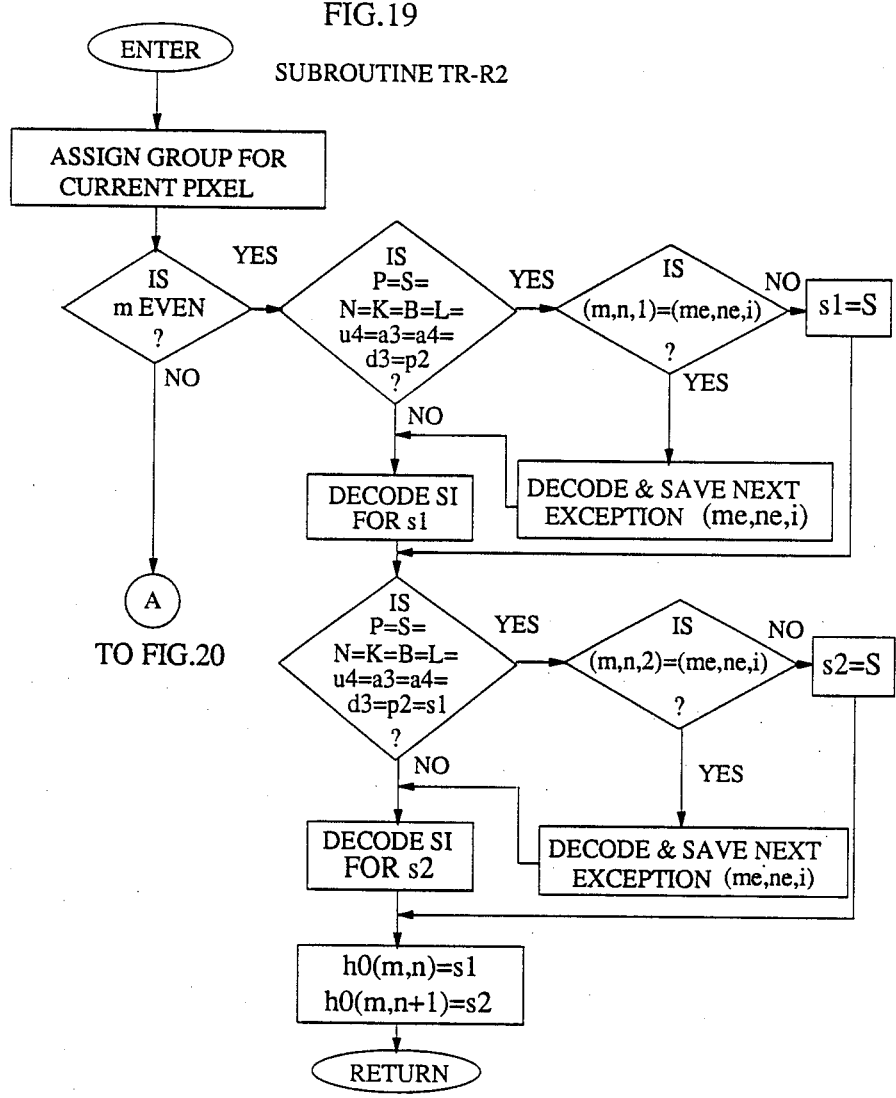
FIG. 19 and FIG. 20 when connected A—A form a flow chart of subroutine TP-R2 used in the operation of another illustrative embodiment of the recomposition processor shown in the flow chart of FIG. 16 which, in accordance with an aspect of the invention, determines non-typically predictable pixels, typically predictable pixels and exceptions to the typically predictable pixels.
Figure 20:
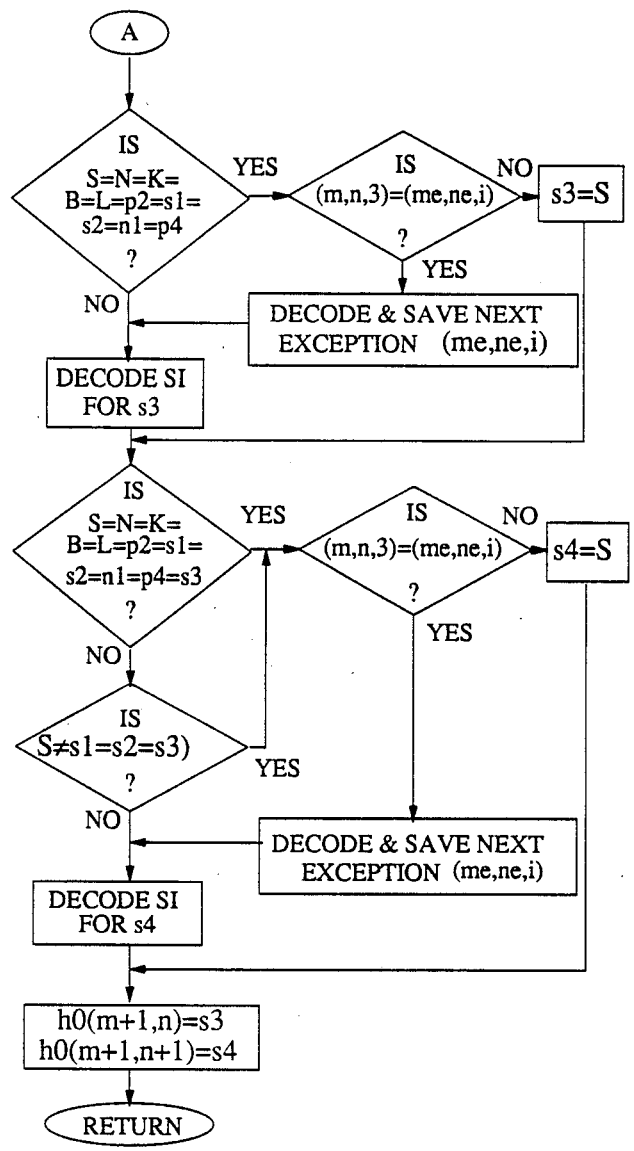

FIGS. 19 and 20 when connected A—A form a flow chart of subroutine TP-R2 illustrating operation of another embodiment of the invention. It is noted that the determination of typically predictable, in this example, is done on an individual high resolution pixel basis. Additionally, an exception also corresponds to an individual high resolution pixel. In this embodiment, a second group of pixels is assigned to be used in conjunction with the current low resolution pixel L1(k,l)=S, in accordance with an aspect of the invention, to determine if a high resolution pixel to be recomposed is typically predictable in accordance with general prediction rules. The group of pixels assigned, in this example, is graphically illustrated in FIG. 13 and the corresponding row and column indices are shown in FIG. 14. It is noted that all the low resolution pixels for low resolution replica I1 are available and that all high resolution pixels prior to the current high resolution pixel being recomposed are also available.

Returning to the flow chart of FIGS. 19 and 20, operation of this embodiment of the invention, as illustrated in subroutine TP-R2, is in accordance with the following:

1. (a) A high resolution pixel, e.g., s1, being recomposed for the current low resolution pixel S is typically predictable, if u4=a3=a4=d3=p2=P=S=N=K=B=L, and if there is no corresponding exception, s1=S.

(b) If u4=a3=a4=d3=p2=P=S=N=K=B=L, and there is a corresponding exception, the next exception (me,ne,i) is decoded and saved for later use and the color of s1 is obtained by decoding the corresponding supplemental information SI1.

(c) If the color of any of u4, a3, a4, d3, p2, P, N, K, B or L is not the same as S, s1 is non-typically predictable and its color is obtained by decoding the corresponding supplemental information SI1.

2. (a) A high resolution pixel, e.g., s2, being recomposed for the current low resolution pixel S is typically predictable, if u4=a3=a4=d3=p2=s1=P=S=N=K=B=L, and if there is no corresponding exception, s2=S.

(b) If u4=a3=a4=d3=p2=s1=P=S=N=K=B=L and there is a corresponding exception, the next exception (me,ne,i) is decoded and saved for later use and the color of s2 is obtained by decoding the corresponding supplemental information SI1.

(c) If the color of any of u4, a3, a4, d3, p2, s1, P, N, K, B or L is not the same as S, s2 is non-typically predictable and its color is obtained by decoding the corresponding supplemental information SI1.

3. (a) A high resolution pixel, e.g., s3, being recomposed for the current low resolution pixel S is typically predictable, if p2=s1=s2=n1=p4=S=N=K=B=L, and if there is no corresponding exception, s3=S.

(b) If p2=s1=s2=n1=p4=S=N=K=B=L and there is a corresponding exception, the next exception (me,ne,i) is decoded and saved for later use and the color of s3 is obtained by decoding the corresponding supplemental information SI1.

(c) If the color of any of p2, s1, s2, n1, p4, N, K, B or L is not the same as S, s3 is non-typically predictable and its color is obtained by decoding the corresponding supplemental information SI1.

4. (a) A high resolution pixel, e.g., s4, being recomposed for low resolution pixel S is typically predictable, if p2=s1=s2=n1=p4=s3=S=N=K=B=L, and if there is no corresponding exception, s4=S.

(b) If p2=s1=s2=n1=p4=s3=S=N=K=B=L and there is a corresponding exception, the next exception (me,ne,i) is decoded and saved for later use and the color of s4 is obtained by decoding the corresponding supplemental information SI1.

(c) If the color of any of p2, s1, s2, n1, p4, s3, N, K, B or L is not the same as S and (s1=s2=s3)≠S, and there is no corresponding exception, s4=S.

(d) If the color of any of p2, s1, s2, n1, p4, s3, N, K, B or L is not the same as S and (s1=s2=s3)≠S and there is a corresponding exception, the next exception (me,ne,i) is decoded and saved for later use and the color of s4 is obtained by decoding the corresponding supplemental information SI1.

(e) If any color of any of p2, s1, s2, n1, p4, s3, N, K, B or L is not the same as S and s1=s2=s3=S, s4 is non-typically predictable and its color is obtained by decoding the corresponding supplemental information SI1.

We claim:

1. A method for encoding pixels in the decomposition of a high resolution image into a low resolution replica and supplemental information for image transmission or storage, comprising the steps of:

a. obtaining a first group of low resolution pixels including a current low resolution pixel being processed and a number of other low resolution pixels in a prescribed relationship to said current low resolution pixel in the low resolution replica;

b. obtaining a second group of high resolution pixels from a high resolution image including a number of high resolution pixels in prescribed relationship to said current low resolution pixel;

c. utilizing said low resolution pixels in said first group and said high resolution pixels in said second group to determine in accordance with prescribed criteria if one or more high resolution pixels to be recomposed for said current low resolution pixel are typically predictable and not an exception, typically predictable and an exception or non-typically predictable;

d. generating exception indications for said current low resolution pixel if it is determined that said one or more high resolution pixels to be recomposed are typically predictable and an exception;

e. generating supplemental information for said current low resolution pixel if it is determined that said one or more high resolution pixels to be recomposed is typically predictable and an exception or non-typically predictable;

f. supplying as an output a representation of said exception indications, if generated, and a representation of said supplemental information, if generated;

g. obtaining a next first group of low resolution pixels as in step (a);

h. obtaining a next second group of high resolution pixels as in step (b); and i. repeating steps (c) through (h) until all the low resolution pixels in the low resolution replica have been processed.

2. The method as defined in claim 1 wherein said number of low resolution pixels in said first group is in a neighborhood of said current low resolution pixel and wherein the step of determining includes the steps of:

j. determining if the color of each low resolution pixel in said first group is the same as the color of said current low resolution pixel;

k. if the result in step (j) is NO, said one or more high resolution pixels to be recomposed for said current low resolution pixel is determined to be non-typically predictable;

l. if the result in step (j) is YES then determining if the color of said one or more of said high resolution pixels in said second group is the same as the color of said current low resolution pixel;

m. if the result in step (l) is NO, said one or more high resolution pixels to be recomposed for said current low resolution pixel is determined to be typically predictable and an exception;

n. if the test result in step (l) is YES, said one or more high resolution pixels to be recomposed for said current low resolution pixel is determined to be typically predictable and not an exception.

3. The method as defined in claim 2 wherein said first group includes said number of low resolution pixels surrounding said low resolution pixel and said second group includes high resolution pixels in a super pixel corresponding to said current low resolution pixel and wherein said supplemental information being generated includes representations of the colors of said high resolution pixels in said super pixel.

4. The method as defined in claim 3 including the step of supplying an encoded representation of said exception indications, if generated, as an output, and supplying an encoded representation of said supplemental information, if generated, as an output.

5. The method as defined in claim 4 further including combining said output representations for interfacing to a transmission network or storage unit.

6. The method as defined in claim 1 wherein the number of low resolution pixels in said first group is in the neighborhood of said current low resolution pixel, and wherein the step of determining includes the steps of:

j. determining if the color of predetermined ones of said low resolution pixels in said first group is the same as the color of said current low resolution pixel and if the color of predetermined ones of said high resolution pixels in said second group is the same as the color of said current low resolution pixel;

k. if the result in step (j) is NO, a first high resolution pixel in said second group is determined to be non-typically predictable;

l. if the result in step (j) is YES, determining if the color of said first high resolution pixel is the same as the color of said current low resolution pixel;

m. if the result in step (l) is NO, said first high resolution pixel is typically predictable and an exception, and an exception indication and supplemental information are generated for said first high resolution pixel;

n. if the result in step (l) is YES, said first high resolution pixel is typically predictable and not an exception;

o. repeating steps (j) through (n) for a second high resolution pixel in said super pixel;

p. repeating steps (j) through (n) for a third high resolution pixel in said super pixel; and q. for a fourth high resolution pixel in said super pixel the step of determining includes the steps of:

r. determining if the color of predetermined ones of said low resolution pixels in said first group is the same as the color of said current low resolution pixel;

s. if the result in step (r) is NO, said fourth high resolution pixel is determined to be non-typically predictable and supplemental information is generated for said fourth high resolution pixel;

t. if the result in step (r) is YES, determining if the color of predetermined ones of said high resolution pixels in said second group is the same as the color of said current low resolution pixel;

u. if the result in step (t) is NO, determining if the color of said first, second and third high resolution pixels is the same as the color of said current low resolution pixel;

v. if the test result in step (u) is YES, said fourth high resolution pixel is determined to be non-typically predictable and supplemental information is generated for it;

w. if the result in step (u) is NO, determining if the color of said fourth high resolution pixel is the same as the color of said current low resolution pixel;

x. if the result in step (w) is NO, said fourth high resolution pixel is determined to be typically predictable and an exception, and an exception indication and supplemental information are generated for it;

y. if the result in step (w) is YES, said fourth high resolution pixel is determined to be typically predictable and not an exception.

7. The method as defined in claim 6 wherein said high resolution pixels in said second group are predetermined higher resolution pixels prior in the high resolution image to said predetermined high resolution pixel currently being processed and wherein said supplemental information includes a representation of the color of said high resolution pixel being processed and, further, including the steps of generating an encoded representation of said exception indication, if any, as an output, generating an encoded representation of said supplemental information, if, any as an output, and interfacing said outputs for transmission or storage.

8. A method for decoding pixels in the recomposition of a high resolution image from a low resolution replica and supplemental information from transmission or storage, comprising the steps of:

a. obtaining a group of low resolution pixels including a current low resolution pixel being processed and a number of other low resolution pixels in a prescribed relationship to said current low resolution pixel in the low resolution replica;

b. obtaining supplemental information, if any, for each of a plurality of high resolution pixels being recomposed for said current low resolution pixel;

c. obtaining exception indications, if any, for each of a plurality of high resolution pixels being recomposed for said current low resolution pixel;

d. utilizing said low resolution pixels in said group to determine in accordance with first prescribed criteria if high resolution pixels to be recomposed for said current low resolution pixel are typically predictable;

e. if the result in step (d) is NO, high resolution pixels being recomposed for said current low resolution pixel are non-typically predictable and said supplemental information is supplied as an output;

f. if the result in step (d) is YES, utilizing said received exception indications, if any, to determine if high resolution pixels being recomposed for said current low resolution pixel are typically predictable and an exception;

g. if an exception indication has been received for said current low resolution pixel the result in step (f) is YES, high resolution pixels being recomposed for said current low resolution pixel are typically predictable and an exception and said supplemental information is supplied as an output;

h. if the result in step (f) is NO, high resolution pixels being recomposed for said current low resolution pixel are typically predictable and not an exception and the colors of said high resolution pixels pixel are determined in accordance with second prescribed criteria and supplied as an output;

i. obtaining a next group of low resolution pixels as in step (a); and j. repeating steps (b) through (i) until the high resolution image has been recomposed.

9. The method as defined in claim 8 wherein said second prescribed criteria is that the color of each of said high resolution pixels is the same as said current low resolution pixel and, further, including the step of supplying said recomposed high resolution pixels to an image output unit.

10. A method of decoding pixels in the recomposition of a high resolution image from a low resolution replica and supplemental information from transmission or storage, comprising the steps of:

a. obtaining a first group of low resolution pixels including a current low resolution pixel being processed and a number of other low resolution pixels in a prescribed relationship to said current low resolution pixel in the low resolution replica;

b. obtaining a second group of high resolution pixels in prescribed relationship to a plurality of high resolution pixels being recomposed corresponding to said current low resolution pixel;

c. obtaining an exception indication, if any, for said current low resolution pixel;

d. obtaining supplemental information, if any, for said current low resolution pixel;

e. utilizing said low resolution pixels in said first group and prescribed ones of said high resolution pixels in said second group in accordance with first prescribed criteria to determine if a first high resolution pixel in said super pixel is non-typically predictable;

f. if the result in step (e) is YES, said high first resolution pixel is non-typically predictable and said supplemental information is supplied as an output;

g. if the result in step (e) is NO, said obtained exception indication is utilized to determine if said first high resolution pixel is typically predictable and an exception or typically predictable and not an exception, if there is no received exception indication for the current low resolution pixel said first high resolution pixel is typically predictable and not an exception it is recomposed in accordance with second prescribed criteria and supplied as an output, if there is an exception indication for the current low resolution pixel said first high resolution pixel is typically predictable and an exception and said supplemental information is supplied as an output;

h. repeating steps (e) through (g) for a second high resolution pixel in said super pixel;

i. repeating steps (e) through (g) for a third high resolution pixel in said super pixel;

j. repeating steps (e) through (g) for a fourth high resolution pixel in said super pixel;

k. obtaining a next first group of low resolution pixels as in step (a);

l. obtaining a next second group of high resolution pixels as in step (b); and m. repeating steps (c) through (l) until the high resolution image has been recomposed.

11. The method as defined in claim 10 wherein said second prescribed criteria is that the color of said high resolution pixel is the same as the color of said current low resolution pixel and, further, including the step of supplying said recomposed high resolution pixels to an image output unit.

12. Apparatus for encoding pixels in the decomposition of a high resolution image into a low resolution replica and supplemental information for transmission or storage, comprising:

a source of high resolution pixels representative of a high resolution image;

means for generating low resolution pixels from said high resolution pixels to obtain said low resolution replica;

means for utilizing a first group of said low resolution pixels including a current low resolution pixel being processed and for utilizing a second group of said high resolution pixels to determine if one or more high resolution pixels to be recomposed for said current low resolution pixel is non-typically predictable, typically predictable and an exception, or typically predictable and not an exception;

means for generating exception indications for each current low resolution pixel for which said one or more high resolution pixels to be recomposed are determined to be typically predictable and an exception;

means for generating supplemental information for each of said current low resolution pixels for which said one or more high resolution pixels to be recomposed is determined to be either typically predictable and an exception or non-typically predictable; and means for supplying as outputs representations of said exception indications, if any, and representations of said supplemental information, if any.

13. The apparatus as defined in claim 12 wherein said group of low resolution pixels includes a number of low resolution pixels in the neighborhood of said current low resolution pixel in the low resolution replica and wherein said means for utilizing includes first means for determining if the color of each of said number of said low resolution pixels in said first group is the same as the color of said current to indicate whether said one or more high resolution pixels to be recomposed for said current low resolution pixel is non-typically predictable if said colors are not the same, and typically predictable if said colors are the same and second means for determining if the colors of predetermined ones of said high resolution pixels in said second group are the same as said current low resolution pixel to indicate whether said one or more high resolution pixels to be recomposed for said current low resolution pixel is typically predictable and an exception if said colors are not the same, or typically predictable and not an exception if said colors are the same.

14. The apparatus as defined in claim 13 further including means for interfacing said output representations to a transmission network or storage unit.

15. The apparatus as defined in claim 12 wherein said first group of pixels is in a prescribed neighborhood in the low resolution replica in relation to said current low resolution pixel and said second group of pixels is in a prescribed neighborhood in the high resolution image in relation to said high resolution pixels to be recomposed for said current low resolution pixel.

16. Apparatus for decoding pixels in the recomposition of a high resolution image from a low resolution replica and supplemental information from transmission or storage, comprising:
    means for obtaining a group of pixels including a current low resolution pixel being processed;
    means for utilizing predetermined pixels in said group to determine in accordance with first prescribed criteria if one or more high resolution pixels being recomposed for said current low resolution pixel is typically predictable;
    means responsive to exception indications, if any, for said current low resolution pixel for determining if said one or more high resolution pixels being recomposed for said current low resolution pixel are typically predictable and an exception or typically predictable and not an exception; and
    means for supplying as an output supplemental information for said current low resolution pixel if said one or more high resolution pixels being recomposed is non-typically predictable or typically predictable and an exception, or for supplying output information in accordance with second prescribed criteria if said one or more high resolution pixels being recomposed is typically predictable.

17. The apparatus as defined in claim 16 wherein said group of pixels includes a number of low resolution pixels in a prescribed neighborhood in the low resolution replica in relation to said current low resolution pixel, and said means for utilizing includes means for determining whether the color of each of said number of low resolution pixels in said group is the same as the color of said current low resolution pixel, wherein if any of said colors is not the same, said one or more high resolution pixels being recomposed is non-typically predictable, otherwise said one or more high resolution pixels being recomposed is typically predictable, and wherein said second prescribed criteria is that the color of said one or more high resolution pixels being recomposed is the same as the color of said current low resolution pixel.

18. The apparatus as defined in claim 16 wherein said group of pixels includes a number of low resolution pixels in a prescribed neighborhood in the low resolution replica in relation to said current low resolution pixel and a number of high resolution pixels in a prescribed neighborhood in the high resolution image in relation to said one or more high resolution pixels being recomposed, and said means for utilizing includes means for determining whether the color of each of predetermined ones of said number of low resolution pixels in said group and of each of predetermined ones of said number of high resolution pixels in said group is the same as said current low resolution pixel, wherein if any of said colors is not the same, said one or more high resolution pixels being recomposed is non-typically predictable, otherwise said one or more high resolution pixels being recomposed is typically predictable.

19. The apparatus as defined in claim 16 further including means for interfacing to a transmission network or storage unit for obtaining low resolution pixels, supplemental information and exception indications.

20. Apparatus for encoding pixels in the progressive decomposition of a high resolution image into a basic low resolution replica and supplemental information, for transmission or storage, comprising:
    a source of high resolution pixels representative of a high resolution image;
    a plurality of decomposition processor means connected in series, a first one of said decomposition processor means in said series being supplied with high resolution pixels from said source and a last one of said decomposition processor means in said series supplying as an output basic low resolution pixels representative of a basic low resolution replica, individual ones of said decomposition processor means other than said first one obtaining high resolution pixels from a prior one of said decomposition processor means in said series, that is, the low resolution pixel output from a prior one of said decomposition processor means is a high resolution pixel input to the next one of said decomposition processor means in said series, each of said decomposition processor means including
    means for generating low resolution pixels from supplied high resolution pixels to obtain a low resolution replica,
    means for utilizing a first group of said low resolution pixels including a current low resolution pixel being processed and for utilizing a second group of said high resolution pixels to determine if one or more high resolution pixels to be recomposed for said current low resolution pixel are non-typically predictable, typically predictable and an exception, or typically predictable and not an exception,
    means for generating exception indications for each current low resolution pixel for which said one or more high resolution pixels to be recomposed are determined to be typically predictable and an exception,
    means for generating supplemental information for each of said current low resolution pixels for which said one or more high resolution pixels to be recomposed are determined to be either typically predictable and an exception or non-typically predictable, and
    means for supplying as an output representations of each of said current low resolution pixels, representations of said exception indications, if any, and representations of said supplemental information, if any; and
    means for supplying representations of said exception indications, representations of said supplemental information from each of said plurality of decomposition processor means and said basic low resolution pixels as an output for transmission or storage.

21. Apparatus as defined in claim 20 wherein said group of low resolution pixels includes a number of low resolution pixels in a prescribed neighborhood in the low resolution replica in relation to said current low resolution pixel and wherein said means for utilizing includes first means for determining if the color of each of said number of said low resolution pixels in said first group is the same as the color of said current to indicate whether said one or more high resolution pixels to be recomposed for said current low resolution pixel is non-typically predictable if said colors are not the same, and typically predictable if said colors are the same and second means for determining if the colors of predetermined ones of said high resolution pixels in said second group are the same as said current low resolution pixel to indicate whether said one or more high resolution pixels to be recomposed for said current low resolution pixel is typically predictable and an exception if said colors are not the same or typically predictable and not an exception if said colors are the same.

22. Apparatus as defined in claim 20 wherein said first group of pixels is in a prescribed neighborhood in the low resolution replica in relation to said current low resolution pixel and said second group of pixels is in a prescribed neighborhood in the high resolution image in relation to said high resolution pixels to be recomposed for said current low resolution pixel.

23. Apparatus for decoding pixels in the progressive recomposition of a high resolution image from a basic low resolution replica and supplemental information from transmission or storage, comprising:

means for supplying basic low resolution pixels representative of the basic low resolution image, representations of exception indications and representations of supplemental information from transmission or storage;

a plurality of recomposition processor means connected in series, a first one of said decomposition processor means in said series being supplied with said basic low resolution pixels and a last one of said decomposition processor means in said series supplying as an output high resolution pixels of said high resolution image, individual ones of said recomposition processor means other than said first one obtaining low resolution pixels from a prior one of said recomposition processor means in said series, that is, the high resolution pixel output from a prior one of said recomposition processor means in said series is the low resolution pixel input to the next one of said recomposition processor means in said series, each of said reccomposition processor means including, means for obtaining a group of pixels including a current low resolution pixel being processed;

means for utilizing predetermined pixels in said group to determine in accordance with first prescribed criteria if one or more high resolution pixels being recomposed for said current low resolution pixel is typically predictable, means responsive to exception indications, if any, for said current low resolution pixel to determine if said one or more high resolution pixels being recomposed for said current low resolution pixel are typically predictable and an exception or typically predictable and not an exception, means for supplying as an output received supplemental information for said current low resolution pixel if said one or more high resolution pixels being recomposed is non-typically predictable or typically predictable and an exception, or for supplying as an output high resolution information in accordance with second prescribed criteria if said one or more high resolution pixels being recomposed is typically predictable; and means for supplying high resolution pixels from each of said plurality of recomposition processors as an output.

24. The apparatus as defined in claim 23 wherein said group of pixels includes a number of low resolution pixels in a prescribed neighborhood in the low resolution replica in relation to said current low resolution pixel, and said means for utilizing includes means for determining whether the color of each of said number of low resolution pixels in said group is the same as the color of said current low resolution pixel, wherein if any of said colors is not the same, said one or more high resolution pixels being recomposed is non-typically predictable, otherwise said one or more high resolution pixels being recomposed is typically predictable, and wherein said second prescribed criteria is that the color of said one or more high resolution pixels being recomposed is the same as the color of said current low resolution pixel.

25. The apparatus as defined in claim 23 wherein said group of pixels includes a number of low resolution pixels in a prescribed neighborhood in the low resolution replica in relation to said current low resolution pixel and a number of high resolution pixels in a prescribed neighborhood in the high resolution image in relation to said one or more high resolution pixels being recomposed, and said means for utilizing includes means for determining whether the color of each of predetermined ones of said number of low resolution pixels in said group and of each of predetermined ones of said number of high resolution pixels in said group is the same as said current low resolution pixel, wherein if any of said colors is not the same, said one or more high resolution pixels being recomposed is non-typically predictable otherwise said one or more high resolution pixels being recomposed is typically predictable.

26. The apparatus as defined in claim 23 further including image output means supplied with said high resolution pixel output from each of said recomposition processor means.

* * * * *